United States Patent
Tran et al.

(10) Patent No.: US 6,550,139 B2
(45) Date of Patent: Apr. 22, 2003

(54) DATUM MACHINING TECHNIQUES FOR CONTROL OF PRINT CARTRIDGE TO MEDIA SPACING

(75) Inventors: Hai Q. Tran, San Diego, CA (US); William S. Colburn, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/836,822

(22) Filed: Apr. 17, 2001

(65) Prior Publication Data

US 2002/0148091 A1 Oct. 17, 2002

(51) Int. Cl.[7] ............................................... B23P 17/00
(52) U.S. Cl. .......................... 29/890.1; 29/557; 29/558; 29/407.05
(58) Field of Search ............................... 29/890.1, 557, 29/558, 407.05; 347/86, 87, 49

(56) References Cited

U.S. PATENT DOCUMENTS 5,408,746 A  4/1995  Thoman et al. ............ 29/890.1

*Primary Examiner*—P. W. Echols

(57) ABSTRACT

A technique for fabricating datum surfaces on a print cartridge body. One technique includes fixing the print cartridge in a tooling fixture after the printhead has been affixed to the body, performing a position measurement on the fixed print cartridge to obtain position measurement data, and using the position measurement data, machining precisely located datum surfaces.

21 Claims, 4 Drawing Sheets

DATUM MACHINING TECHNIQUES FOR CONTROL OF PRINT CARTRIDGE TO MEDIA SPACING

TECHNICAL FIELD OF THE INVENTION

This invention relates to ink jet printing systems, and more particularly to techniques for providing accurate datums for a print cartridge.

BACKGROUND OF THE INVENTION

Ink-jet printers are in widespread use today for printing functions in personal computers, graphics plotters, facsimile machines and other applications. Such printers typically include replaceable or semipermanent print cartridges which hold a supply of ink and carry the ink-jet printhead. The cartridge typically is secured into a printer carriage which supports one or a plurality of cartridges above the print medium, and traverses the medium in a direction transverse to the direction of medium travel through the printer. Electrical connections are made to the printhead by flexible wiring circuits attached to the outside of the cartridge. In a typical cartridge, the flexible wiring circuit is called a TAB head assembly, or THA, and the printhead is fabricated on the TAB circuit and integrated into the THA. The carriage receptacle has a corresponding electrical circuit with exposed contact pads which contact cartridge interconnect pads when the cartridge is mounted in the carriage. Each printhead includes a number of tiny nozzles defined in a substrate and nozzle plate structure which are selectively fired by electrical signals applied to the interconnect pads to eject droplets of ink in a controlled fashion onto the print medium. The cartridge may be connectable to auxiliary supplies of ink for replenishing the internal supply held in the cartridge.

In order to achieve accurate printing quality, each removable cartridge includes datum surfaces which engage against corresponding carriage surfaces to precisely locate the cartridge when inserted into the carriage. In this manner, when a cartridge ink supply is exhausted, the cartridge may be replaced with a fresh cartridge, and the printhead of the new cartridge will be precisely located relative to the carriage. The printer carriage receptacle and the cartridge are therefore designed together, so that the cartridge fits accurately within the carriage receptacle, the respective circuit pads and datum surfaces match up, and the cartridge can be removed and replaced with a fresh cartridge as needed.

For a typical inkjet printer, the media is loaded into the printer, and is advanced along a media path to a print area. A swath-type printer includes a carriage mounted for scanning movement along a swath axis, transverse to the media path at the print area. Hereafter, the media path is known as the X-axis, the scanning or swath axis is the Y-axis, and the Z-axis is mutually orthogonal to the X-axis and the Y-axis. For color printing, the carriage holds a plurality of ink-jet printheads, each for printing a different color ink, typically black, cyan, magenta and yellow. The printer can include a media drive mechanism for moving the media along the media path, and a carriage drive mechanism for scanning the carriage along the scan axis. The printer controller issues print control signals to cause the printheads to eject droplets of ink in a controlled manner to form a desired image or plot on the medium.

Inkjet printing is based on accurate ballistic delivery of small ink droplets to exact locations onto the paper or other media. Typically the droplet placement occurs onto a grid of different resolutions, most common grids being 300×300 dpi or 600×600 dpi, although other solutions are continuously being considered. One key factor for sharp and high quality images stems from the accuracy of the droplet placement.

Improvement of droplet position error during printing has been achieved by controlling drop trajectory through control of nozzle geometry, specifically controlling the angle of the nozzle axis relative to the media surface. Normal manufacturing variability requires that some variability in drop trajectory will always exist, and therefore the droplet position error improvements that can be realized by controlling drop trajectory alone are limited.

SUMMARY OF THE INVENTION

A technique for fabricating datum surfaces on a print cartridge body is described, and includes fixing the print cartridge in a tooling fixture, performing a position measurement on the fixed print cartridge to obtain position measurement data, and using the position measurement data to determine precision datum surface locations on the cartridge body in relation to the tooling fixture, conducting machining operations at one or more datum locations on the body to fabricate precision datum surfaces on the body. The datum surfaces are spaced from the nozzle array surface by a respective distance along a first direction, and determine a nozzle-array-to-print-media spacing during printing operations. The fabrication of the datum surfaces using the position measurement data provides accurate location of the datum surfaces relative to the nozzle array substrate in a direction transverse to the substrate.

BRIEF DESCRIPTION OF THE DRAWING

These and other features and advantages of the present invention will become more apparent from the following detailed description of an exemplary embodiment thereof, as illustrate in the accompanying drawings, in which.

DETAILED DESCRIPTION OF THE PREFERRED EMBODIMENTS

In an exemplary embodiment, a process is employed to machine the Z axis datums on a printhead cartridge. The "Machine the Z Datums" (MTZ) tool and process can be integrated into a final assembly process for the cartridge. The MTZ process machines the Z datums of the print cartridge body based on the position of the THA surface after the THA has been mounted on the cartridge body. Thus, for this exemplary process, the print cartridge will have the THA attached to the cartridge body, cured, and wrapped at the time the MTZ process is performed.

The THA is mounted to the cartridge body using known techniques. In one exemplary technique, a one-part, thermally cured epoxy adhesive can be employed to attache the THA to the body. The adhesive is placed on the headland area of the cartridge body prior to placement of the THA. The THA is then placed on the headland region, allowing the adhesive to contact the THA. The THA is temporarily held in place by re-flowing a thermoplastic adhesive between the THA and cartridge body. The cartridge assembly proceeds into a thermal cure process, which cures the adhesive, forming a mechanical bond and fluid seal between the THA and the cartridge body. The cartridge assembly then proceeds onto further processes to wrap the remaining regions of the THA around the cartridge body, and fasten these regions of the THA to the cartridge body by re-flowing thermoplastic adhesive between the THA and cartridge body. Fabrication of the cartridge assembly is not complete at this point, as ink and additional components are added in subsequent assembly steps.

Figure 1:
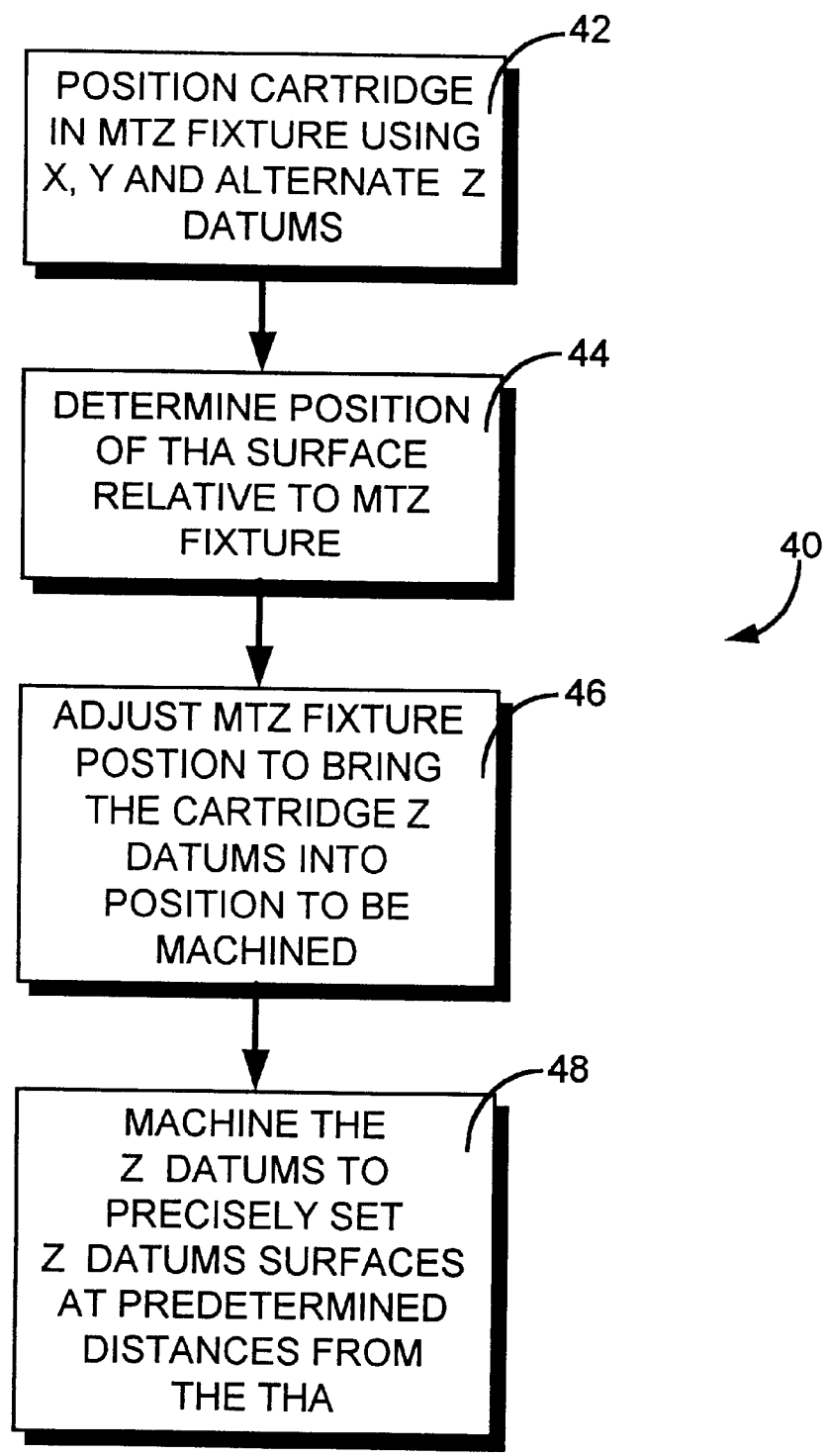
FIG. 1 is a flow diagram of an exemplary embodiment of a datum machining process in accordance with aspects of this invention.
Figure 2:
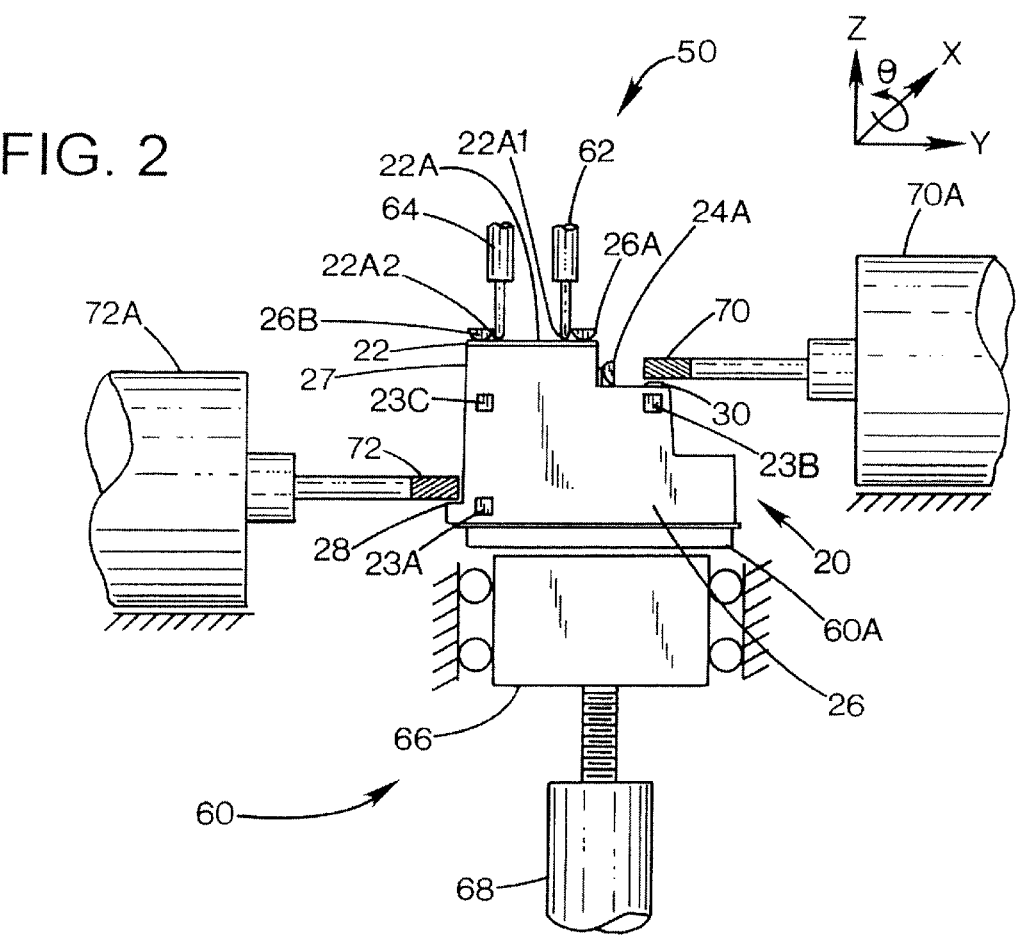
FIG. 2 is a diagrammatic schematic of an exemplary embodiment of a process station for performing the machining process.

FIG. 1 is a simplified flow diagram of steps of an exemplary embodiment of the MTZ process 40. FIG. 2 is a diagrammatic view of an exemplary embodiment of the MTZ process station 50. In a first step 42, the print cartridge 20 is fixtured in an MTZ tool 60 using the cartridge "X" datums 23A, 23B, 23C and "Y" datum 24A, and alternate "Z" datum locations 26A, 26B which are used only during the MTZ process, and not for carriage position registration. The tool 60 includes a fixture structure 60A which holds the cartridge, a precision slide 66 and a position adjustment mechanism 68. The cartridge is precisely located on the fixture structure 60A and the slide apparatus 66 using the X, Y and alternate Z datums. In an exemplary embodiment, the fixture structure 60A has built-in biasing features, so that the cartridge body is biased into the machine fixture, contacting the body at the datums indicated above.

For example, the fixture can be a three-sided structure, with the biasing features provided by air cylinders, solenoids, spring-loaded pins, or other types of biasing devices. The cartridge 20 has a THA 22 mounted at a cartridge snout region 27, and the THA surface 22A is positioned for probe measurements. The cartridge body 26 has two Z-axis datums 28, 30 in this exemplary embodiment, although fewer or more Z-axis datums can be employed. The Z-axis datums are machined in accordance with an aspect of this invention.

In a second step 44, two points 22A1, 22A2 on the THA surface 22A are measured in the Z axis using automated measuring probes 62, 64. Data from the two measuring probes is used to establish the position of the cartridge relative to the tool reference frame. In an exemplary embodiment, a Z axis position of the physical center of the THA is derived, along with the angle of the THA on the "theta" axis, again relative to the tool reference frame.

In a third step 46, based on the data from the THA surface probe measurement, the position of the print cartridge 20 is adjusted in the vertical or Z axis to bring the Z datums 28, 30 into position to be machined. This adjustment is accomplished by the precision slide apparatus 66 being moved along the Z axis by a drive system 68, which can comprise a motor-driven leadscrew, for example. The appropriate Z-axis correction is made to the tool fixture to position the cartridge assembly such that the "Z2" cartridge datum 30 may be machined. In an exemplary embodiment, the process station 50 further includes an X axis position adjustment mechanism 80 (FIG. 4), which can include an air bearing and X axis drive system to move the fixture 60A in the X direction.

Machining of the cartridge datum locations is performed at step 48 using a milling cutter in a precision machining spindle under control of the process station, although alternate techniques can alternatively be employed to remove or add material from or to the cartridge datum location. For example, grinding, laser machining, chemical/dry etching, abrasive blasting, water jet machining, thermal forming (to heat, melt or reflow the material), photo-imaging to add material, and sputtering are all techniques which can be employed to remove or add material to or from the Z datum locations.

Figure 3:
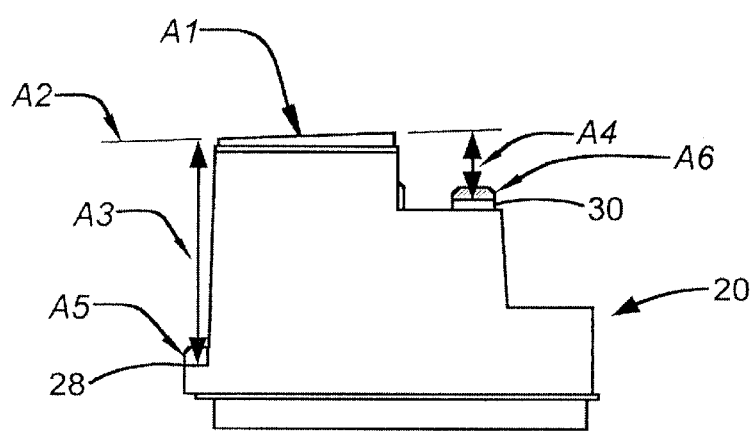
FIG. 3 is a side view of a print cartridge, illustrating the Z datums machined in accordance with an aspect of the invention.

FIG. 3 is a simplified side view of the printhead 20, showing the various dimensions of interest in this exemplary embodiment, and where die or substrate misalignment and the datum structures are exaggerated for clarity. A1 indicates the surface of the nozzle array die or substrate. Data from the measurement probes is used to locate line A2, i.e. a line defined by two measured points on the substrate surface, approximating the Z height and theta-X orientation of the THA substrate relative to the tooling fixture, e.g., to the frame of the fixture. A3 represents the normal distance from the desired Z1 datum position to line A2. A4 is the normal distance from the desired Z2 datum position to line A2. Given the equation for line A2, and the desired Z axis dimensions A3, A4, a cut depth for each Z datum is calculated. A5 indicates the material removed from the Z1 datum to bring the datum surface to the desired position. A6 represents the material removed from the Z2 datum to bring the datum surface to the desired position.

In this exemplary embodiment, milling cutter 70 is mounted in a machining spindle 70A, which rotates the milling cutter 70. Milling cutter 72 is mounted in a machining spindle 72A, which rotates the cutter 72. The fixture 60A is passed by the Z2 machining cutter 70, moving in the X axis, removing a precise amount of material from the "Z2" datum location. Once the cartridge is clear of the Z2 machining cutter 70, a second Z axis correction is made to the cartridge fixture to position the cartridge such that the "Z1" cartridge datum 28 may be machined. The fixture is passed by the Z1 machining cutter 72, removing a precise amount of material from the "Z1" datum location.

The design of any given cartridge body may be such that, depending on setup of the process, material may or may not be removed from or added to one or both cartridge datum locations.

With the Z datums precisely machined, the print cartridge 20 is released from the tool fixture 60, completing the MTZ process.

Figure 4:
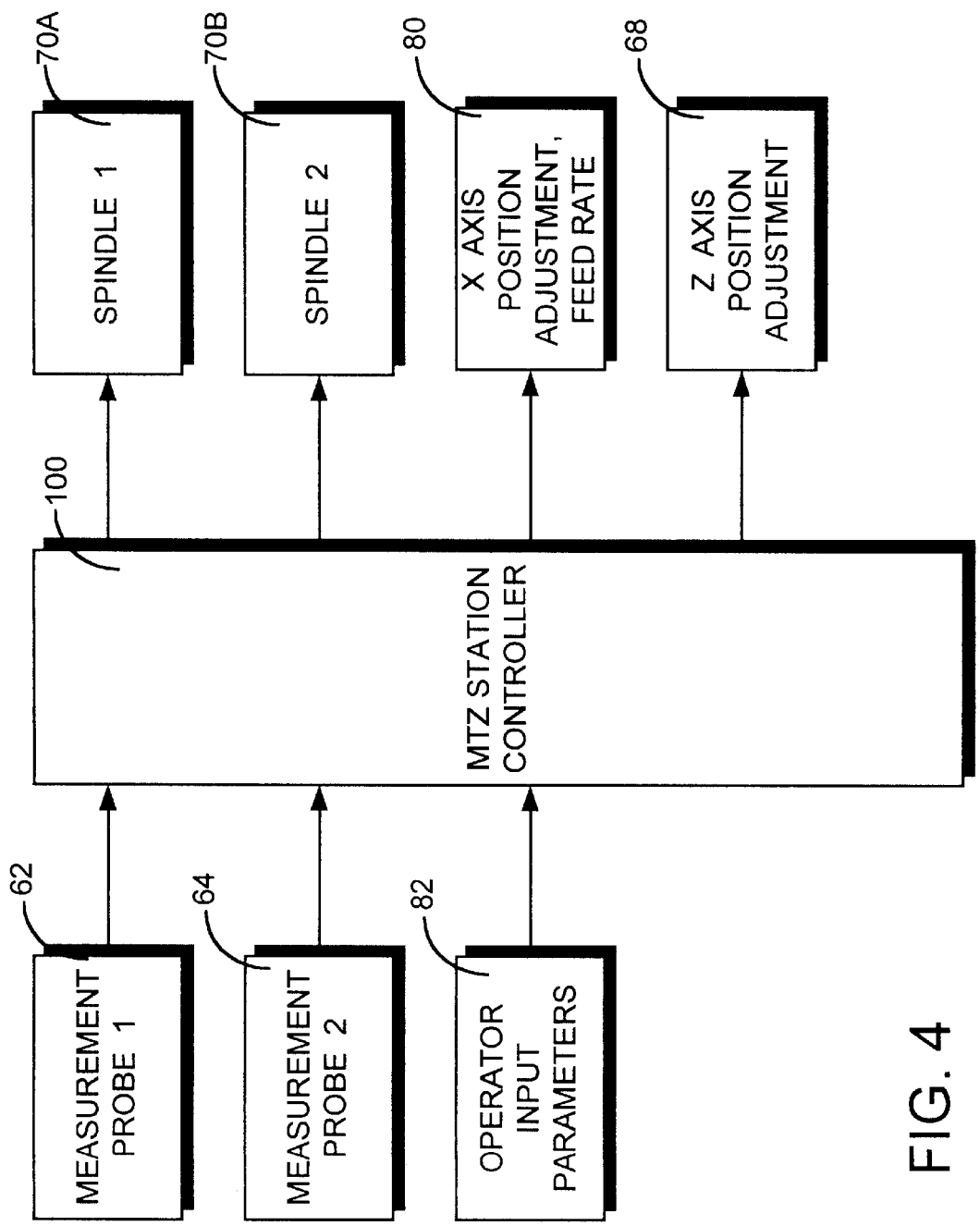
FIG. 4 is a schematic block diagram of control elements of the process station illustrated in FIG. 2.

FIG. 4 shows the control system elements for the MTZ system. A process station controller 100 is programmed to control the process station, receiving the measurement information from the two probes 62, 64, and calculating the necessary moves for machining the datums. The controller 100 is responsive to operator input parameters 82, e.g. specifying the print cartridge type, spindle speeds, spindle feed rates determined by the X axis position adjustment 80, desired or nominal Z datum positions, and the like. The controller can be implemented by a microprocessor or microcomputer, a personal computer, ASIC, or other known computing system. The calculations can be performed in real time, or pre-calculated and stored in look up tables in the controller memory. The controller then issues the necessary commands to the Z-axis position adjustment mechanism 68 to position the cartridge for the machining process, to the X-axis position adjustment mechanism 80 for moving the fixture past the cutters in a controlled movement to obtaining a desired feed rate, and controls the spindles 70A, 72A accordingly.

The MTZ process can in particular applications provide several advantages. One is that manufacturing variations of the molded print cartridge body, variations in the fabrication and assembly of the THA, and variations incurred in the final assembly of the print cartridge can all be accommodated by the MTZ process. The MTZ process is able to accommodate manufacturing variability by providing the capability of offsetting the effect of normal manufacturing variability or tolerances, by controlling the dimensions of the Z datum surfaces once assembly of the non-ink-filled cartridge has been essentially completed. For example, the assembly variation (3 sigma) in a known assembly process is +/−100 $\mu$m, as measured from the THA surface to the Z datum locations. With the MTZ process, through the modification or machining of the Z-datum locations, the assembly variation can be reduced substantially, e.g. in one example to +/−21 $\mu$m.

Another advantage is that the mean (machined) dimension of the Z datums relative to the THA surface can be easily controlled by setup of the process tool. Further, the process is readily adaptable to accommodate multiple cartridge types, and the tooling can readily accommodate types having the same basic external dimensions.

Figure 5B:
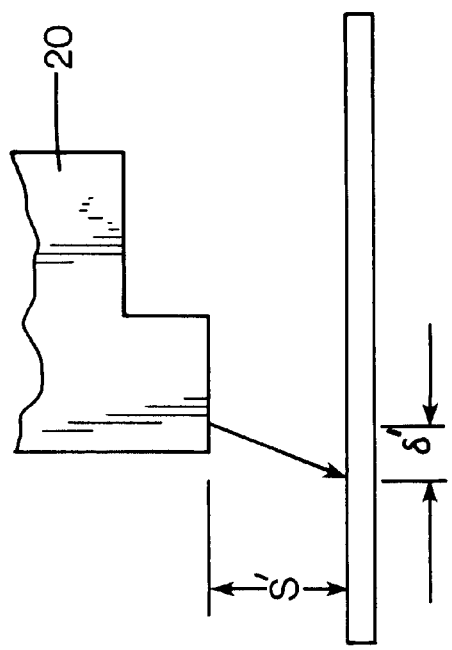
FIGS. 5A–5B illustrate how lower cartridge-to-paper spacing significantly reduces the dot placement error.
Figure 5A:
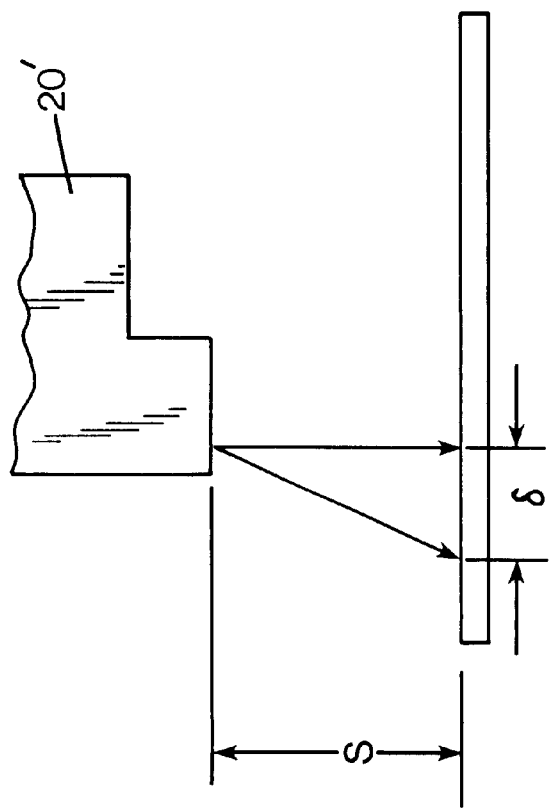

Machining of the Z datums provides an additional benefit in drop position error by controlling, and therefore minimizing, the distance traveled by the ink drop from the exit of the nozzle to the media surface. In this manner, variability in drop trajectory as the drop leaves the nozzle will produce less drop position error of the ink drop on the media. The MTZ process minimizes the dot placement error because it allows the writing system to have a lower cartridge-to-media spacing, and with less variability than in prior systems. This is due to the increased Z-axis datum accuracy, which in turn leads to increased accuracy in the positioning of the THA relative to the Z-axis datums, allowing much smaller tolerances in the cartridge-to-media spacing. A smaller cartridge-to-media spacing significantly reduces the dot placement error, as illustrated in FIGS. 5A and 5B. In FIG. 5A, a spacing S is provided between the printhead on the cartridge and the paper or other print medium. The distance between the theoretical drop placement and the actual drop placement, for a given angular drop error, is sigma. FIG. 5B illustrates the reduction in the error distance sigma' when the spacing S' is reduced. In an exemplary embodiment employing the MTZ process, an improved cartridge-to-media spacing of 1.2 mm+/−0.25 mm (3 sigma) is achieved, in comparison to a cartridge-to-media spacing of 1.4 mm+/−0.35 mm for a cartridge which does not employ the MTZ machining.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A method for fabricating datum surfaces on an ink jet print cartridge body having an ink jet printhead nozzle array defined in a planar substrate mounted thereon, comprising:
   fixing the print cartridge in a tooling fixture;
   performing one or more position measurements on the fixed print cartridge to obtain position measurement data of a position of the substrate relative to the tooling fixture;
   using the position measurement data to determine one or more precision datum surface locations on the cartridge body in relation to the tooling fixture, conducting machining operations at one or more datum locations on the body to fabricate one or more precision datum surfaces on the body, each of said one or more datum surfaces spaced from the nozzle array surface by a respective distance along a first direction, said one or more precision datum surfaces for determining a nozzle-array-to-print-media spacing in said direction during printing operations.

2. The method of claim 1, wherein said performing one or more position measurements includes:
   measuring a plurality of spatially separated location positions on a surface of the substrate.

3. The method of claim 1, wherein said performing one or more position measurements includes:
   measuring a plurality of spatially separated location positions on a surface of the substrate using a set of mechanical probes.

4. The method of claim 1, further comprising using said position measurement data to determine the location of a physical center of the substrate along an axis transverse to the substrate, and an angular orientation of said substrate relative to said axis.

5. The method of claim 1, wherein:
   said conducting machining operations includes using a machine tool to remove body material at said one or more datum locations.

6. The method of claim 5, wherein:
   said removing body material includes providing relative motion between the print cartridge and the machine tool to accurately position the one or more datum locations in relation to the machine tool to remove said body material.

7. The method of claim 6, wherein:
   said removing cartridge body material includes using a milling cutter tool to remove said body material.

8. The method of claim 1, wherein:
   said conducting machining operations includes adding material at said one or more datum locations.

9. The method of claim 1, wherein said conducting machining operations at one or more datum locations includes conducting machining operations at first and second datum locations located at different distances from the nozzle array in said first direction.

10. The method of claim 9 wherein said first datum location is on a first cartridge sidewall, said second datum location is on a second cartridge sidewall, and said first and second sidewalls are generally parallel.

11. A method for reducing droplet position errors during printing ink jet printing operations using an ink jet print cartridge body having an ink jet printhead nozzle array defined in a planar substrate mounted thereon, comprising:
   fixing the print cartridge in a tooling fixture;
   performing one or more position measurements on the fixed print cartridge to obtain position measurement data of a position of the substrate relative to the tooling fixture;
   using the position measurement data to determine one or more precision datum surface locations on the cartridge body in relation to the tooling fixture, conducting machining operations at one or more datum locations on the body to fabricate one or more precision datum surfaces on the body, each said one or more datum surfaces spaced from the nozzle array surface by a respective distance along a first direction, said one or more precision datum surfaces for determining a nozzle-array-to-print-media spacing in said direction during printing operations;

using said one or more precision datum surfaces to accurately locate the print cartridge in a printing system with a nozzle-array-to-print-media spacing of 1.2 mm plus or minus up to 0.25 mm; and ejecting droplets from the nozzle array onto the print medium during printing operations.

12. The method of claim 11, wherein the step of using the datum surfaces to accurately locate the print cartridge in a printing system includes:

installing the print cartridge in a printer carriage with the precision datum surfaces in contact with a corresponding set of carriage datum surfaces.

13. The method of claim 11, wherein said performing one or more position measurements includes:

measuring a plurality of spatially separated location positions on a surface of the substrate.

14. The method of claim 11, wherein said performing one or more position measurements includes:

measuring a plurality of spatially separated location positions on a surface of the substrate using a set of mechanical probes.

15. The method of claim 11, further comprising using said position measurement data to determine the location of a physical center of the substrate along an axis transverse to the substrate, and an angular orientation of said substrate relative to said axis.

16. The method of claim 11, wherein:

said conducting machining operations includes using a machine tool to remove body material at said one or more datum locations.

17. The method of claim 16, wherein:

said removing body material includes providing relative motion between the print cartridge and the machine tool to accurately position the one or more datum locations in relation to the machine tool to remove said body material.

18. The method of claim 17, wherein:

said removing cartridge body material includes using a milling cutter tool to remove said body material.

19. The method of claim 11, wherein:

said conducting machining operations includes adding material at said one or more datum locations.

20. The method of claim 11, wherein said conducting machining operations at one or more datum locations includes conducting machining operations at first and second datum locations located at different distances from the nozzle array in said first direction.

21. The method of claim 20 wherein said first datum location is on a first cartridge sidewall, said second datum location is on a second cartridge sidewall, and said first and second sidewalls are generally parallel.

* * * * *